United States Patent Office 3,576,756
Patented Apr. 27, 1971

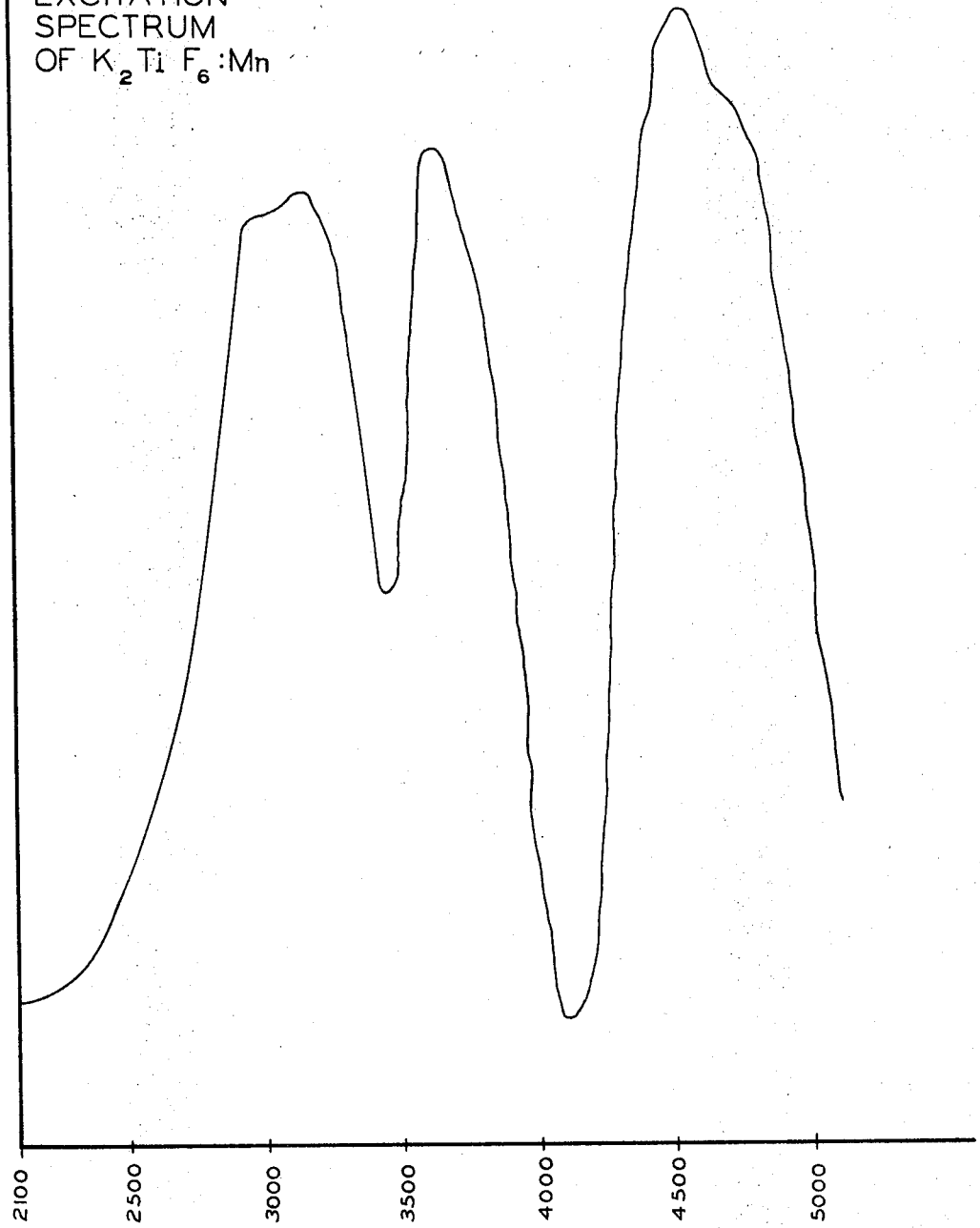

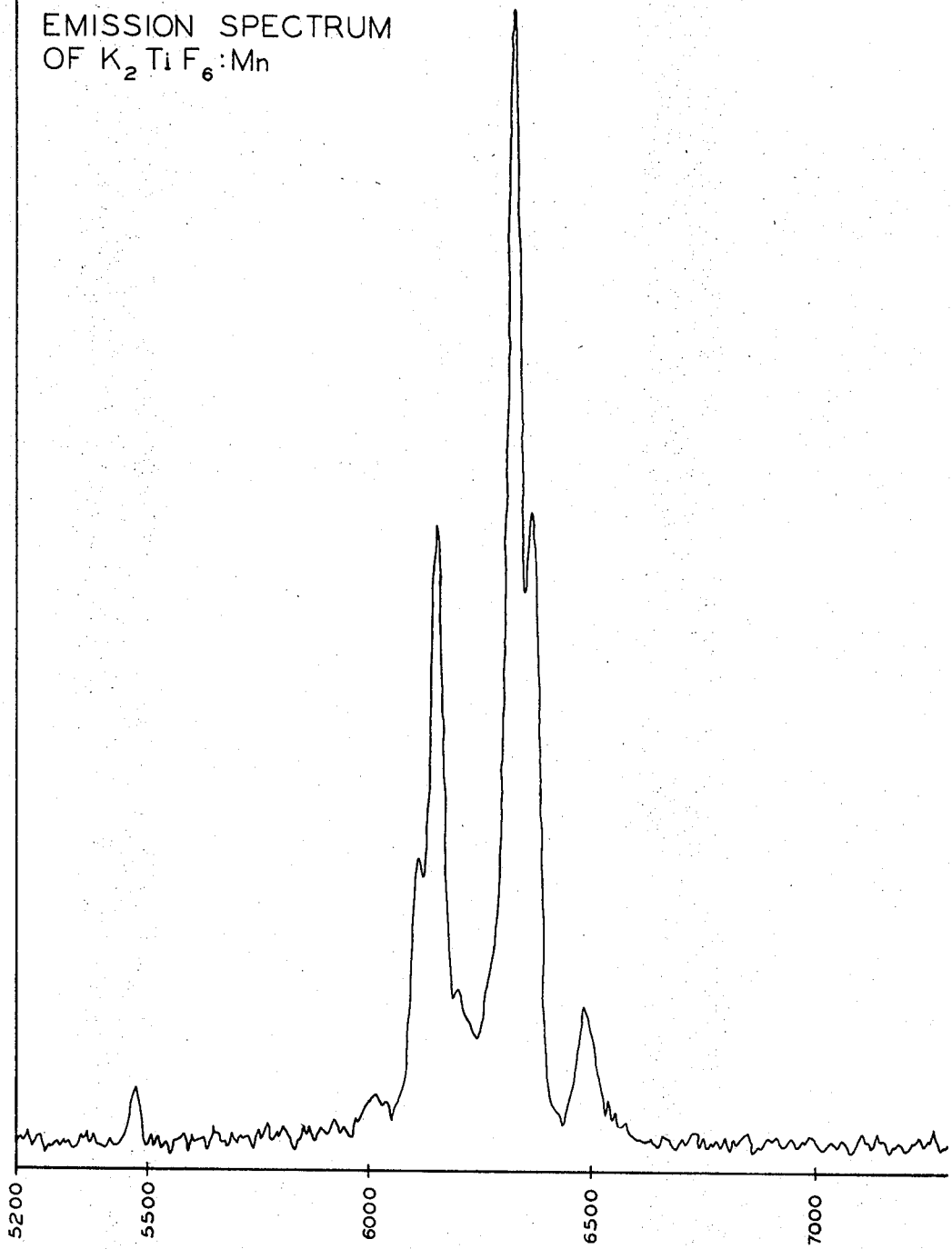

3,576,756
FLUOCOMPLEXES OF TITANIUM, SILICON, TIN AND GERMANIUM, ACTIVATED BY TETRAVALENT MANGANESE
Michael E. Russo, St. Louis, Mo., assignor to Mallinckrodt Chemical Works, St. Louis, Mo.
Filed June 12, 1968, Ser. No. 736,504
Int. Cl. C09k 1/54, 1/56, 1/60
U.S. Cl. 252—301.4          9 Claims

ABSTRACT OF THE DISCLOSURE

Activated fluocomplexes of the type $M_2XF_6$:Mn, where X represents silicon, titanium or tin or mixtures of these elements with each other or with germanium, M represents a monovalent cation and Mn is tetravalent, are yellowish, crystalline phosphors excited by U.V. and visible radiation to fluoresce strongly in the red. $K_2TiF_6$:Mn is typical. It responds strongly to excitation by radiation of 3150, 3650 and 4550 A.U. wavelengths. Its principal emission peak is at 6320 A.U., with secondary peaks at 6140 and 6360 A.U. The phosphors may be prepared by mixing, in solution, $MnF_6^=$, $H_2XF_6$ and the fluoride of the desired cation(s), and crystallizing out the phosphor product.

BACKGROUND OF THE INVENTION

The present invention relates to the field of inorganic chemistry and more particularly to fluorescent fluocomplexes of titanium, silicon, tin and germanium.

Fluorescent titanate, silicate, stannate and germanate compositions are known, including the use therein of manganese as an activator. Such compositions are disclosed, for example, in U.S. Pats. 2,103,085, 2,118,091, 2,210,087, 2,222,509, 2,447,448, 2,470,173, 2,479,158, 2,491,865, 2,532,774, 2,547,790 and 2,697,076. Modified magnesium germanate phosphors, in which a portion of the oxygen has been replaced by fluorine, are disclosed in U.S. Pat. 2,744,303. However, fluorescent fluocomplexes of titanium silicon or tin or mixtures of these elements with each other or with germanium are unknown in the prior art.

SUMMARY OF THE INVENTION

It is an object of the present invention to provide novel fluorescent compositions which are fluocomplexes of titanium, silicon, tin and germanium, activated by tetravalent manganese. It is also an object to provide methods of preparing such fluorescent compositions. Other objects and features will be in part apparent and in part pointed out hereinafter.

The present invention is directed to fluorescent compositions represented by the formula $M_2XF_6$:Mn, where X is selected from the group consisting of titanium, silicon and tin and mixtures thereof with each other and with germanium, M represents a monovalent cation, and the manganese activator is tetravalent. The proportion of manganese may vary from about 0.002% to about 5.6% by weight of the composition. The invention also includes methods of preparing fluorescent compositions of the type mentioned above which comprise combining in solution $MnF_6^=$ and $H_2XF_6$, adding M cations and separating the $M_2XF_6$:Mn thus formed.

The compositions of the invention may be regarded as consisting of a crystalline matrix of the type $M_2XF_6$ in which a small fraction of the tetravalent matrix metal ion component is replaced by a corresponding amount of tetravalent manganese. The following formulas are illustrative of matrix compositions from which the fluorescent compositions of the invention may be derived: $Na_2TiF_6$, $K_2SiF_6$, $Cs_2TiF_6$, $Na_2SnF_6$, $KNaSiF_6$, $$Na_2Si_{.5}Ti_{.5}F_6$$

$K_2Ti_{.5}Ge_{.5}F_6$ and $NaKSi_{.6}Ti_{.4}F_6$. Other illlustrative matrix compositions will be obvious to those skilled in the art.

The novel compositions of the invention are excited by ultraviolet and visible radiation and they fluoresce strongly in the red. These characteristics are disclosed in greater detail in the figures, which present spectral curves for $K_2TiF_6$:Mn, a typical embodiment of the invention.

The activated fluocomplex phosphors of the invention are useful in fluorescent lamps, for example, as color modifiers in high pressure mercury vapor lamps, or as fluorescent pigments.

The compositions of the invention may be made by the following general method. The dioxide of the matrix metal ($XO_2$) is dissolved in an excess of hydrofluoric acid to form a solution of $H_2XF_6$. Manganese activator is added in the form of the appropriate fluomanganate ($MnF_6^=$) and to the resulting solution is added a solution containing the desired cation in hydrofluoric acid. A water-miscible organic solvent such as acetone is added to precipitate the product, which is filtered off, washed with a like solvent and dried.

BRIEF DESCRIPTION OF THE DRAWINGS

In the accompanying drawings, FIGS. 1 and 2 are graphical representations of the excitation spectrum and emission spectrum, respectively, of a fluorescent composition of the invention.

DESCRIPTION OF THE PREFERRED EMBODIMENTS

Although the symbol M, as used above, embraces the monovalent cations broadly, it has particular reference to the ammonium and alkali metal ions. The preferred proportions of manganese are about 0.05 to 0.30% by weight, the most effective proportion being about 0.15%.

The invention is further illustrated by the following examples:

Example 1

$K_2TiF_6$:Mn

Titanium dioxide (79.9 gm.) was dissolved in excess hydrofluoric acid (48% HF, 1000 ml.) to form a solution containing $H_2TiF_6$. Potassium fluomanganate [$K_2MnF_6$, 2.3 gm.; prepared by the method of H. Bode, H. Jenssen, F. Bandte, Angew. Chem. 65, 304 (1953)] was dissolved in the $H_2TiF_6$ solution. To this was added a solution prepared by dissolving potassium fluoride dihydrate ($KF.2H_2O$; 188.26 gm.) in hydrofluoric acid (48% HF, 500 ml.). Precipitation was effected by adding acetone (1200 ml.) to the solution resulting from above. The crystalline material was separated by filtration, washed with small amounts of acetone and allowed to dry.

X-ray diffraction patterns obtained with the above product were characteristic of $K_2TiF_6$ (ASTM 8–488); no other phase was detected.

Differential thermal analysis indicates a phase transition at 371°, characteristic of $K_2TiF_6$. [See Chem. Abst. 61405v (1967); N. P. Sorokin, G. E. Dmitrevski, Yu. I. Kol'tsov, V. S. Blinov and A. A. Beltiskaya. Zh. Neorg. Khim. II, 2833–5 (1966) Russian.]

The manganese content of the above product is 0.2% Mn by weight, as determined by atomic absorption spectroscopy. FIG. 1 shows the excitation spectrum of a sample of this product. The curve indicates the intensity of light of approximately 6300 A.U. wavelength emitted as the sample was irradiated by radiation of constant energy and varying wavelength within the range of about 2000–5100 A.U. Peak emission occurs with excitation wavelengths of about 3150, 3650 and 4550 A.U.

FIG. 2 shows the emission spectrum of the same material under constant excitation with radiation of 3650 A.U. The principal peak occurs at about 6320 A.U. Secondary peaks occur at about 6140 and 6360 A.U.

Additional fluorescent compositions of the type $M_2XF_6$:Mn were prepared by methods similar to that described in Example 1. The source materials used and the resulting products are indicated in the table.

TABLE

| Example No. | Source materials | | | | | Product | |
|---|---|---|---|---|---|---|---|
| | Metal oxide | | $K_2MnF_6$ (g.) | Cation source | | Formula | Mn content (percent w./w.) |
| | Identity | Wt. (g.) | | Compound | Wt. (g.) | | |
| 2 | $TiO_2$ | 79.9 | 2.3 | NaF | 84.0 | $Na_2TiF_6$:Mn [1] | 0.17 |
| 3 | $TiO_2$ | 4.0 | 0.24 | $Cs_2CO_3$ | 16.3 | $CsTiF_6$:Mn | 0.2 |
| 4 | $TiO_2$ | 4.0 | 0.16 | $Rb_2CO_3$ | 11.2 | $Rb_2TiF_6$:Mn | 0.2 |
| 5 | $SiO_2 \cdot XH_2O$* | 6.9 | 0.20 | $KF \cdot 2H_2O$ | 18.8 | $K_2SiF_6$:Mn [2] | 0.2 |
| 6 | $SiO_2 \cdot XH_2O$* | 6.9 | 0.12 | NaF | 8.4 | $Na_2SiF_6$:Mn [3] | 0.2 |
| 7 | $SnO_2$ | 6.0 | 0.049 | $KF \cdot 2H_2O$ | 9.4 | $K_2SnF_6$:Mn | 0.93 |
| 8 | $SnO_2$ | 6.0 | 0.049 | NaF | 4.2 | $Na_2SnF_6$:Mn | 0.12 |
| 9 | $TiO_2$ / $SiO_2 \cdot XH_2O$* | 4.0 / 3.45 | 0.049 | $KF \cdot 2H_2O$ | 15.2 | $K_2Ti._5Si._5F_6$:Mn | 0.047 |
| 10 | $TiO_2$ / $SnO_2$ | 4.0 / 7.45 | 0.049 | $KF \cdot 2H_2O$ | 15.2 | $K_2Ti._5Sn._5F_6$:Mn | 0.039 |
| 11 | $SiO_2 \cdot XH_2O$* / $SnO_2$ | 3.45 / 7.45 | 0.049 | $KF \cdot 2H_2O$ | 15.2 | $K_2Sn._5Si._5F_6$:Mn | 0.041 |
| 12 | $TiO_2$ / $GeO_2$ | 2.00 / 3.65 | 0.114 | $KF \cdot 2H_2O$ | 7.61 | $K_2Ti._5Ge._5F_6$:Mn | 0.2 |
| 13 | $TiO_2$ | 4.0 | 0.366 | $NH_4F$ | 3.7 | $(NH_4)_2TiF_6$:Mn | 0.04 |

[1] X-ray diffraction pattern similar to that of ASTM 15–581 $Na_2TiF_6$.
[2] X-ray diffraction pattern similar to that of ASTM 7–217 $K_2SiF_6$.
[3] X-ray diffraction pattern similar to that of ASTM 8–36 $Na_2SiF_6$.
*87% $SiO_2$.

The excitation spectra at room temperature of the fluorescent products of Examples 2–13 were all similar to FIG. 1, with broad bands near 3150, 3650 and 4550 A.U. The emission spectra were similar to FIG. 2, with several relatively sharp peaks between 6000 and 6500 A.U.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:
1. A fluorescent composition represented by the formula:

$$M_2XF_6:Mn$$

where X is selected from the group consisting of titanium, silicon and tin and mixtures thereof with each other and with germanium, M is selected from the group consisting of alkali metal and ammonium cations, and the manganese activator is tetravalent, and in which the proportion of Mn is in the range of about 0.002% to about 5.6% by weight.

2. A fluorescent composition as defined in claim 1 wherein the proportion of Mn is in the range of about 0.05% to about 0.30% by weight.

3. A fluorescent composition as defined in claim 1 wherein M is potassium.

4. A fluorescent composition as defined in claim 1 wherein M is sodium.

5. A fluorescent composition as defined in claim 1 wherein X is titanium.

6. A fluorescent composition as defined in claim 1 wherein X is silicon.

7. A fluorescent composition as defined in claim 1 wherein X is tin.

8. A process of preparing a fluorescent composition represented by the formula:

$$M_2XF_6:Mn$$

where X is selected from the group consisting of titanium, silicon and tin and mixtures thereof with each other and with germanium, M is selected from the group consisting of alkali metal and ammonium cations, and the manganese activator is tetravalent, which comprises admixing in aqueous solution, $H_2XF_6$ and $MnF_6^=$ and adding M ions, and thereafter separating $M_2XF_6$:Mn from said solution by the addition thereto of a water-miscible organic solvent.

9. A process as defined in claim 8 wherein the proportion of Mn in $M_2XF_6$:Mn is in the range of about 0.002% to about 5.6% by weight.

References Cited

UNITED STATES PATENTS 2,806,002  9/1957  Smith _____ 252—301.4

OTHER REFERENCES

Chemical Abstracts, vol. 54, subject index 13185 and p. 9490d.

Kroger—Some Aspects of the Luminescence of Solids, 1948, p. 283.

ROBERT D. EDMONDS, Primary Examiner